UNITED STATES PATENT OFFICE.

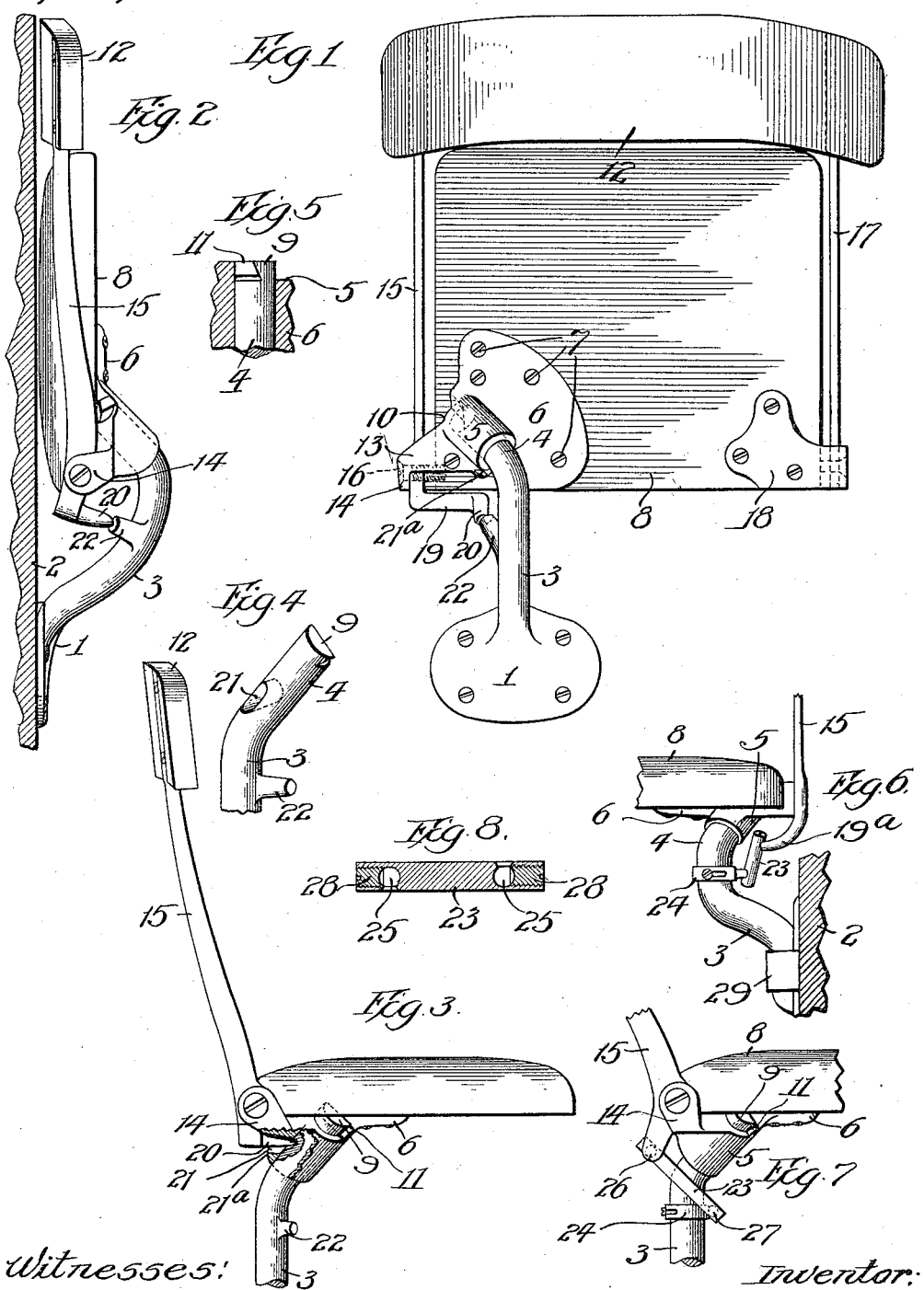

EMIL G. PANDOW, OF CHICAGO, ILLINOIS, ASSIGNOR TO GEORGE W. COSTELLO, OF CHICAGO, ILLINOIS.

FOLDING SEAT.

1,060,358. Specification of Letters Patent. Patented Apr. 29, 1913.

Application filed July 20, 1910. Serial No. 572,857.

*To all whom it may concern:*

Be it known that I, EMIL G. PANDOW, citizen of the United States, residing at Chicago, in the county of Cook and State of Illinois, have invented a certain new and useful Improvement in Folding Seats, of which the following is a full, clear, concise, and exact description.

My invention relates to folding seats in general and more particularly to auxiliary folding seats for automobiles. Its object is to provide a seat of this character which is of simple construction, which is cheap to manufacture, which can be readily swung from its open or operative position to its closed position, or vice versa, and which in either position is securely held against accidental displacement.

Auxiliary seats are frequently provided one on each side and in front of the rear seat of automobiles. When in position for use, they are turned preferably so that the passengers will face in the direction of travel. When not needed for use, the seats are folded so that the seat bottoms and backs, in case backs are provided, are brought into vertical planes close to the inner sides of the body of the automobile and preferably back out of the path of the doors. In the case of my invention herein described, the angle of the pivot pin and the position of the mounting of the sleeve or socket which fits the pivot pin are such that the chair seat by a single movement or swing may be carried approximately 90° in folding, that is from its horizontal position, or position of use, to its vertical position or folded position, and by the same movement rotated approximately 90° so as to be out of the path of the door and in line with and near to the side of the body of the vehicle.

In its preferred embodiment my invention comprises a seat-bottom having a socket plate secured on the under side at one of the rear corners thereof, the socket in said plate fitting the pintle of a pedestal bracket, the upper end of said pintle, constituting the pivot pin about which the seat is turned, being preferably inclined forwardly from the base, that is in the direction in which the seat faces and at an angle of approximately 45° toward the side of the vehicle against which the seat is adapted to be folded. The socket for receiving the pin instead of extending at a right angle to the seat-bottom is inclined at an acute angle thereto across the corner of said bottom. By such structure the seat can be changed from its folded to its operative position, that is to its position for use, by a single turning movement upon its pivot. The pivot pin and the socket plate are provided with coöperating parts forming a stop for limiting the turning movement of the seat in unfolding the same, said pintle and seat being also provided with coöperating means forming a stop for the seat in its folded or inoperative position. The seat is also preferably provided with a back hinged thereto, in which latter case one of the elements of the said last mentioned stop is preferably carried by one of the posts of the chair-back.

The several features of my invention may be more readily understood by reference to the accompanying drawings in which—

Figure 1 is a view, looking toward the right-hand side of the vehicle upon which the seat is secured, of the seat in its folded position; Fig. 2 is a view, looking toward the rear of the vehicle, of the seat in its folded position; Fig. 3 is a view, looking from the side of the vehicle, of the seat in its open position; Fig. 4 is a fragmentary perspective view of the pivot pin forming a part of the pedestal bracket; Fig. 5 is a fragmentary, sectional view through the socket and pivot pin; Figs. 6 and 7 are fragmentary views, at right angles to each other, of a modified form of the invention; and Fig. 8 is an enlarged, detailed, sectional view of one of the elements shown in Figs. 6 and 7.

Similar letters of reference refer to similar parts throughout the several views.

Referring first to Figs. 1 to 5, inclusive, the pedestal bracket 1 is shown as mounted upon the right-hand side 2 of an automobile body, the pintle 3 of said bracket extending away and upwardly from the side of the automobile, and is then inclined toward the side 2, upwardly and forwardly at approximately an angle of 45°. The upper end of the bracket thus projects toward the side wall 2 at an acute angle with respect thereto and also at an acute angle with respect to both a vertical and a horizontal plane at right angles to the side wall 2. Such upper end 4 of the pintle 3 forms a pivot pin for the socket provided in the sleeve 5 of the socket plate 6. The sleeve 5 is inclined at an acute angle with respect to the bottom 8 across the corner thereof, as shown most clearly in Fig. 1. Rigidly secured to the socket plate 6 by screws 7, or in any other suitable manner, is the seat-bottom 8, the seat being thus adapted to be turned about the pivot pin 4. It is apparent, therefore, that the pin and socket which constitute the axis about which said seat is swung underlie the seat bottom, extending downwardly and rearwardly therefrom, and are also inclined at an acute angle with respect to the side walls upon which the seat is mounted. At its outer end the pivot pin 4 is cut away upon its upper side, or the side most nearly facing the interior of the vehicle, to form a stop 9. The upper end of the sleeve 5 is likewise cut away as at 10 upon the side thereof adjacent the corner of the seat-bottom at which the plate is secured, the opposite side of the sleeve being provided with a transverse lug 11 extending partially across the face of said socket and adapted to engage with the stop 9 to limit the unfolding, turning movement of the seat and cause the same to stop in a horizontal position, as shown in Fig. 3. The seat is preferably provided with a folding back 12. In such case, the socket plate 6 may be provided, as shown, with a laterally extending arm 13 having ears 14 to which the side post 15 of said folding back is pivoted by a pin 16. The opposite post 17 of said back is likewise pivoted to a plate 18 provided at the opposite corner of the seat-bottom 8. The lower end of the post 15 is provided with an inward extension or lug 19, having at its end a downwardly extending point or pin 20 adapted, in the unfolded position of the seat, to fit in a socket 21 in the pivot pin 4, and thereby to lock the seat against accidental movement. The sleeve 5 has a hole 21ª near its lower end, which hole 21ª is in alinement with the socket 21 when the seat is unfolded, the pin 20 then projecting through said hole into said socket, as shown in Fig. 3. In the folded position of the chair the pin 20 engages with a stud 22 upon the pintle 3, thus limiting the extent of the folding movement of the seat.

Assuming that the seat is in the folded position shown in Figs. 1 and 2, the bottom 8 of the seat may be brought to the horizontal position shown in Fig. 3 by a single turning movement forward about the pivot pin 4, such forward movement being stopped, when the seat-bottom 8 has arrived at the horizontal position, by the engagement of the stop 9 and the lug 11. The back 12 is then swung up and backward from its folded position, the pin 20 entering the socket 21 and limiting the inclination of the back 12 and also locking the seat against rotation about the pivot pin 4. It will be noted that in its folded position the center of gravity of the seat is at the rear of the pivot pin 4, that is in the direction toward which the seat is folded, thus preventing the seat from becoming accidentally unfolded. The seat is thus, both in its folded or unfolded position, secured against accidental displacement.

In Figs. 6, 7 and 8, I have shown a modification of the invention in which the pin 20 and the socket 21 are dispensed with. In lieu thereof, the extension 19ª of the post 15 is connected by a universal joint to one end of a short rod 23, the opposite end of which is likewise connected by a universal joint with an adjustable collar 24 secured upon the pintle 3. This modified structure of my invention has the advantage that the universal joint connection 19ª, 23 and 24 between the pintle 3 and the arms 15 is such that the turning movement of the bottom 8 operates to fold or unfold the back 12 at the same time that the bottom 8 is folded or unfolded. Such universal joint connection thus, in addition to acting as a stop for limiting the open position of the back, also automatically folds or unfolds said back. The connecting rod 23 is provided near its opposite ends with sockets 25 for the reception of the balls 26 and 27 upon the extension 19ª and collar 24, respectively, said balls being held in said sockets by the threaded pins 28 or other suitable means.

In both modifications of the invention shown in the drawings, the bottom 8 can be lifted from the pivot pin 4, the seat being thus readily removable from the vehicle. The pivot upon which the seat turns can also be so constructed as to be removable, as shown in Fig. 6 in which the pintle 3 is inserted in a socket piece 29 mounted upon the side of the vehicle.

In prior structures it has been customary to provide an arm pivoted to swing in a horizontal plane with the bottom of the seat hinged to the arm. In the structure of my invention such arm is lacking, thereby increasing the available free space in the automobile. Moreover, in my invention, the seat rotates directly from its horizontal or open position to its vertical or folded position there being no arm or other part which swings in a horizontal plane.

It is obvious that modifications other than the ones described may be made in the structure of my invention without departing from the broader scope of the same as defined in the appended claims.

I claim:—

1. In a folding seat for vehicles, the combination with a bracket secured at its base to the side wall of the body of the vehicle, said bracket at its upper end projecting toward said side wall at an acute angle with respect thereto and also at acute angles with respect to both a vertical and a horizontal plane at right angles to said side wall, said upper end of the bracket constituting a pivot member, of a seat-bottom, a second pivot member mounted upon the rear of said seat-bottom and coacting with said first mentioned pivot member, and means for limiting the rotatable movement of said pivot members with respect to each other.

2. In a folding seat, the combination with a seat-bottom, of a socket plate secured upon the under side and near one of the rear corners thereof, said socket plate being provided with a sleeve inclined across the corner of said bottom at an acute angle to the plane thereof, said sleeve being cut away, on the side thereof adjacent the corner of the seat-bottom at which said plate is secured, to provide a stop, and a pivot pin fitting in said socket, said pin, at its upper end, being inclined forwardly with respect to the seat in its operative position and also toward the plane assumed by the seat in its folded position, the outer end of said pin being cut away upon the upper side thereof to provide a stop adapted to engage with the stop upon said sleeve to hold said seat-bottom, when unfolded, in a horizontal plane.

3. In a folding seat for vehicles, the combination with a seat-bottom, of a socket plate secured upon the under side and near one of the rear corners thereof, said socket plate being provided with a pivot member inclined across the corner of said bottom at an acute angle to the plane thereof, a bracket secured at its base to the side of the body of the vehicle, said bracket being bent upwardly and away from the side to which it is secured and then toward the same at a forward inclination with respect to the seat in its operative position to provide at its upper end a second pivot member co-acting with said first mentioned pivot member, and means for limiting the turning movement of the seat-bottom about said pivot pin.

4. In a folding seat, the combination with a seat-bottom, of a pivot member provided on the under side thereof and extending at an acute angle with respect to the plane of said seat-bottom, a second pivot member co-acting with said first mentioned pivot member, said second pivot member being forwardly inclined with respect to the seat in its operative position, a back hinged to the corners of said seat-bottom, and a lug carried by said back having a point adapted in the unfolded position of said seat to engage with said second pivot member.

In witness whereof, I, hereunto subscribe my name this 18th day of July A. D., 1910.

EMIL G. PANDOW.

Witnesses:
ALFRED H. MOORE,
GEORGE E. FOLK.